United States Patent [19]
Piggott

[11] 3,817,377
[45] June 18, 1974

[54] METHOD AND APPARATUS FOR FILTERING FLOWABLE MATERIAL

[75] Inventor: David C. Piggott, Burlington, Ontario, Canada

[73] Assignee: Poly-Converters Limited, Oakville, Ontario, Canada

[22] Filed: Nov. 6, 1972

[21] Appl. No.: 303,750

Related U.S. Application Data

[63] Continuation-in-part of Ser. No. 55,809, July 17, 1970, abandoned.

[52] U.S. Cl. .................. 210/76, 210/81, 210/409, 210/433, 210/DIG. 15
[51] Int. Cl. ............................................. B01d 29/38
[58] Field of Search ....... 210/76, 81, 409, 433, 434, 210/DIG. 15

[56] References Cited
UNITED STATES PATENTS

| | | | |
|---|---|---|---|
| 1,990,992 | 2/1935 | Lang et al. | 210/409 |
| 2,513,795 | 7/1950 | Gliss | 210/489 X |
| 2,784,843 | 3/1957 | Braunlich | 210/446 X |
| 3,337,053 | 8/1967 | Sommermeyer | 210/434 X |
| 3,459,307 | 8/1969 | Collins, Jr. | 210/433 X |

FOREIGN PATENTS OR APPLICATIONS

| | | | |
|---|---|---|---|
| 65,610 | 4/1950 | Netherlands | 210/433 |

*Primary Examiner*—John Adee
*Attorney, Agent, or Firm*—Stanley J. Rogers

[57] ABSTRACT

A method and apparatus for separating unwanted particulate material from a flowable material, such as hot thermoplastic polymer, wherein a stream of the flowable material with the particulate material entrained therein is fed to a body containing a filter element so that they pass in operative contact with the filter element with a velocity sufficient to maintain the particulate material entrained in the reduced flow as the filtered material passes from the stream through the filter element. As applied to a continuous polymer extrusion machine the method and apparatus permits continuous operation of the machine with highly contaminated polymer material.

20 Claims, 9 Drawing Figures

INVENTOR.
DAVID C. PIGGOTT

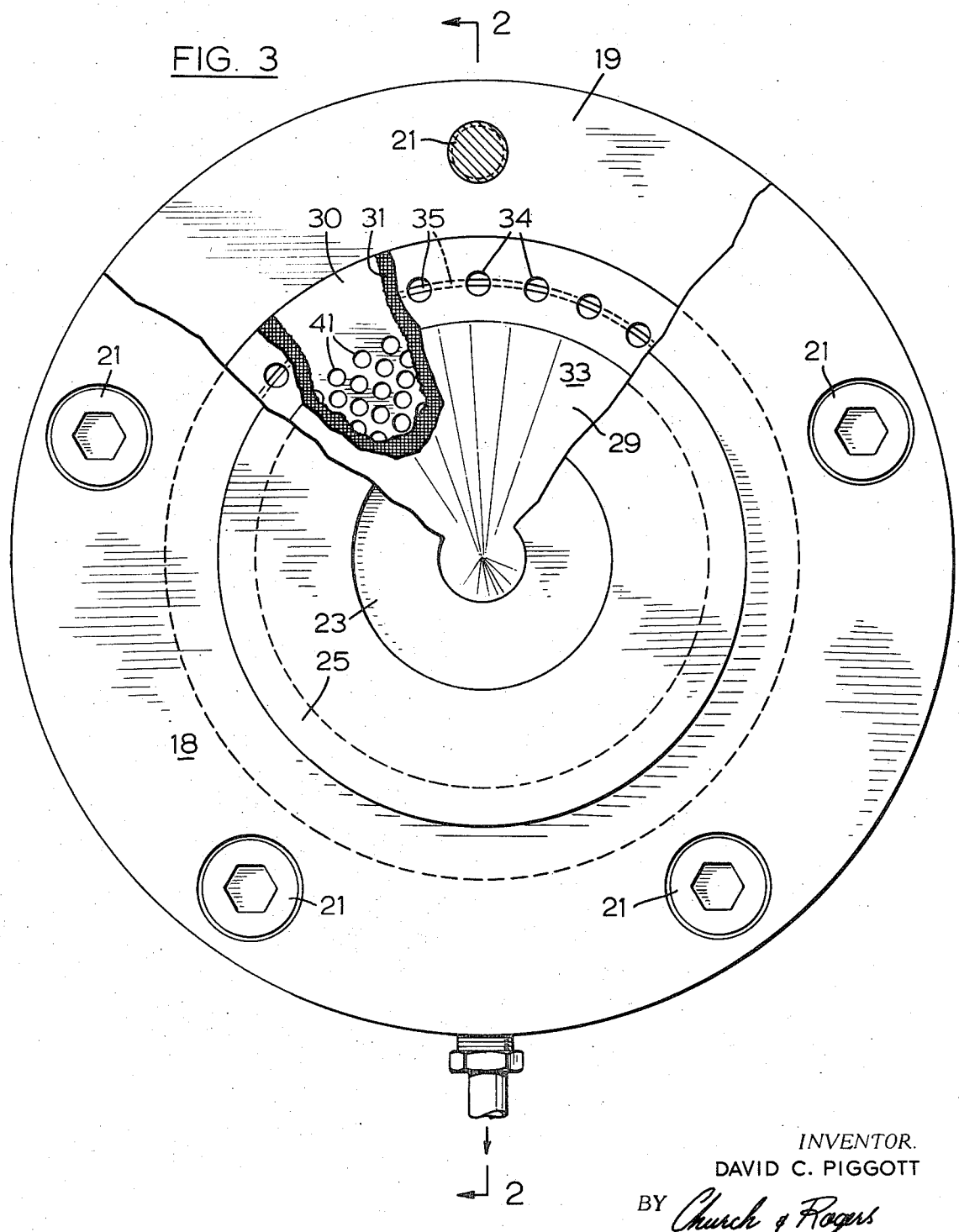

METHOD AND APPARATUS FOR FILTERING FLOWABLE MATERIAL

CROSS REFERENCE TO RELATED APPLICATION

The present application is a continuation-in-part of my U.S. Pat. application Ser. No. 55,809. filed July 17, 1970, now abandoned.

FIELD OF THE INVENTION

The invention is concerned with a new method and apparatus for separating unwanted particulate material from a stream of flowable material.

REVIEW OF THE PRIOR ART

It is a continuing problem in the processing of hot polymeric material to ensure that the material fed through the machine for processing is free of unwanted material, such as particles of dirt, metal, lumps of gel and carbonized polymer produced for example by localized hot-spots in the mixing, blending and pressurizing stages of the machine. This problem is found especially in apparatus for the continuous production of tubular polymer films, wherein the polymer is fed to an accurate circular die and the resulting continuous tube is expanded by internal air pressure. The presence of particles in the polymer melt can damage the lips of the expensive die, and/or can jam in the die lips and cause holes in the film through which the pressurizing air leaks out, causing local reductions in the diameter and thickness of the tubular film and resulting in an unmarketable non-uniform product, or even causing total collapse of the extruded tube.

It is therefore the usual practice to interpose a filter, usually called a filter pack, between the polymer feeding means of the machine and the die. As the filter retains more and more of the filtered unwanted particles its flow capacity is reduced until eventually it must be changed for cleaning. Such filter changes usually require cessation of the machine's operation. Various arrangements have been proposed, such as rotating or alternating quick-change filters, to minimize the time during which the machine is out of action and the extruded tube is collapsed. Desirably changing the filter should not interfere with the maintenance of the expanded tube, because of the difficulty of re-establishing the tube, once it has collapsed. Difficulty is also experienced with these prior arrangements in obtaining adequate sealing of the said rotating or quick-change filters and its supporting structure under the temperatures (e.g. 300° – 600° F) and pressures involved (e.g. 3,000 – 10,000 p.s.i.).

The problems described above have so far rendered it difficult, and usually economically impossible, to make use of contaminated scrap polymer as feed material for a continuous extrusion machine, such as a film forming machine, where the flow of material must be kept relatively uniform for an extended period of time, since the large quantity of unwanted particles found therein necessitates too frequent changes of the filter with its accompanying disruption of the expanded tube and loss of production. The usual solution has therefore been to subject the scrap material to a preliminary extrusion and filtration operation to produce clean, filtered pellets. The pelletizing operation does not require precise control of pellet size or the constant feed of a film-forming machine, and the filtered pellets can then be used as the feed material by the film-forming machine for extended runs without disruption of the expanded tube.

DEFINITION OF THE INVENTION

It is an object of the present invention to provide a mew method and apparatus for separating unwanted particulate material from a stream of flowable material, such as a polymeric material.

It is another object to provide a new method and apparatus as defined in the preceding paragraph and applicable to a continuous operation, wherein the filtered particles are removed continuously from the apparatus druing the operation thereof to reduce substantially or even eliminate the need for filter changing and consequent disruption of the process.

It is a specific object to provide a new method and apparatus for processing polymeric material in a film-forming machine such as to permit substantially continuous operation of a film-forming machine employing contaminated scrap polymer directly as a feed material thereto, while avoiding the need for an intervening pelletizing step.

In apparatus in accordance with this invention a filter element in a separator body forms part of a wall of a by-pass flow path and is interposed in a flow-through path. A passage wall of the by-pass flow path cooperates with the filter inlet face in providing decreasing flow capacity across the said inlet face, while a passage wall of the flow-through path cooperates with the filter outlet face in providing a controlled increasing flow capacity across the outlet face. The said flow passages cooperate for maintenance of the flow velocity of the material passing in the by-pass path over the filter inlet face above a value which will cause particulate material to be entrained in the remaining flowable material for prevention of its deposition on the filter element inlet face.

A throttle may be connected to the first outlet to receive unfiltered material of the by-pass path therefrom and to maintain the back pressure of the unfiltered material of the flow-through path within predetermined limits. The said flow passages of the by-pass and flow-through flow paths pass the mixed material therethrough with a ratio at least 2.5:1 between the velocity of the reduced volume mixed material stream passing in the by-pass path across the filter element inlet face and the velocity of the filtered material stream passing in the flow-through path through the filter element.

In a method in accordance with the invention the stream of flowable polymer material is fed to the separator inlet continuously at a controlled rate, the filtered polymer material is simultaneously continuously from the second outlet at a controlled rate, the unfiltered polymer material with unfiltered particulate material remaining mixed therein is discharged simultaneously continuously from the first outlet through a throttle valve and the throttle valve is adjusted to control the discharge of said unfiltered missed material from the first outlet to maintain a ratio of at least 2.5:1 between the velocity of the reduced volume mixed material stream passing in the by-pass path across the filter element face and the velocity of the filtered polymer material stream passing in the flow-through path through the filter element.]

DESCRIPTION OF THE DRAWINGS

Particular preferred embodiments of the invention will now be described, by way of example, with reference to the accompanying diagrammatic drawings, wherein:

FIG. 3 is an end elevation of the apparatus of FIG. 2 with parts thereof broken away as necessary to show the interior thereof.

In all of the figures of the drawings similar parts of the embodiments are given the same reference number.

DESCRIPTION OF THE PREFERRED EMBODIMENTS

Figure 1:
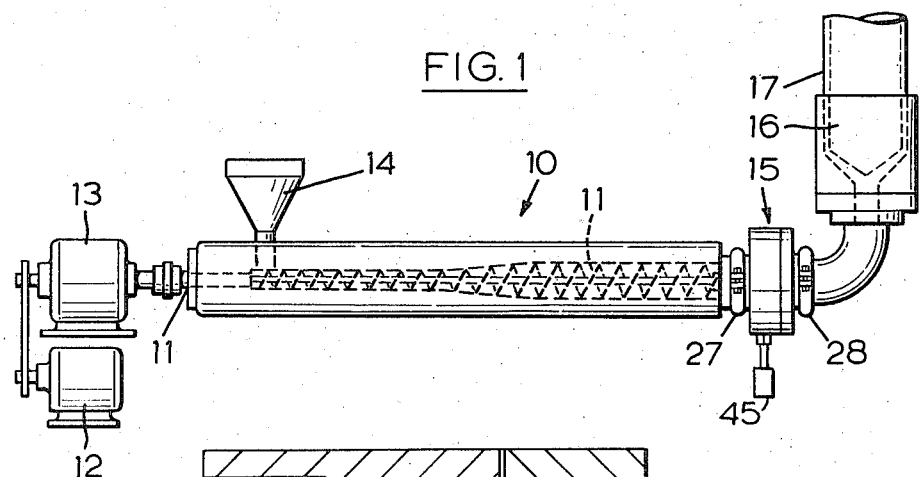
FIG. 1 shows schematically an extrusion apparatus for the production of continuous plastic tube from polymer material, and incorporating separator apparatus in accordance with the invention.

The prior art portion of the apparatus illustrated by FIG. 1 is of conventional form for the production of a continuous tube of thermoplastic polymer material, and comprises material feed means constituted by an elongated, heated, thermostatically controlled body 10 housing an elongated, helically threaded screw 11 driven about its longitudinal axis by a motor 12 via a speed-reducing gearing 13. The polymer is fed into a hopper 14, from which it passes into the lands or grooves of the screw. The polymer is moved by the screw toward the other end of the body, and at the same time is heated, compressed, mixed, and thoroughly plasticized to a desired melted, flowable state by the combination of the mechanical action of the screw and the heat supplied from the body 10. The melted polymer is fed under pressure from the machine outlet, through a separator device 15 of the invention to a circular die 16, from the lips of which it issues in the form of a vertically ascending continuous cylinder 17, usually known in the art as a film "bubble." The wall of the bubble is cooled as quickly as possible after it leaves the die outlet, and usually is "blown" to a larger diameter by feeding air under pressure to its interior through the die. The resulting cooled, thin-wall tube usually is flattened and rolled into a roll for storage ready for subsequent processing, e.g. for the manufacture of bags in a bag-making machine, and/or for printing on a printing machine.

It is well known to those skilled in the art that the melted polymer should be fed to the die with a temperature, pressure and volume of flow that are as constant as possible, in order to obtain a tube of as uniform physical characteristics as possible, particularly a uniform diameter and wall thickness. It is also known that large particles, for example of dirt or overheated gelled or carbonized polymer, should not be permitted to reach the die, since they may damage the precisely machined die lips, and/or they may jam in the die lips and produce a perforation in the wall of the bubble, particularly a bubble that is blown under internal pressure. Such a perforation tears a hole in the bubble and reduces the internal pressure of the bubble and causes a discontinuity in the diameter and wall thickness of the tube, with the result that the adjacent portion of the tube must be scrapped. Moreover, a substantial amount of unmarketable scrap film usually is produced in again stabilizing the internal pressure and size of the bubble to the required value.

It is the invariable practice therefore to provide some type of filter element or screen-pack between the machine outlet and the die. The known through-flow filters are reasonably satisfactory with a relatively clean polymer material, since the loss of porosity of the filter as it becomes choked by the trapped contaminant particles is relatively slow, and the consequent change in back-pressure due to the loss of porosity is very gradual, so that the filter need only be removed infrequently for cleaning and/or replacement. An acceptably small amount of scrap tube is therefore produced during such infrequent cleaning or replacement, and the amount of such scrap can be minimized by use of special "quick-change" filter arrangements, whereby the dirty filter element is removed and simultaneously replaced with a clean filter element.

The filters known hitherto are much less satisfactory with lower grades of polymer, and they become virtually unusable with reclaimed waste polymer which contains substantial quantities of dirt, gel and carbon particles, and printing ink residues. Thus, with such materials the filter clogs rapidly, causing such a rapid uneven change in filter back pressure that it is difficult or even impossible to maintain uniform film bubble thickness and necessitating such frequent filter changes that an unacceptably high proportion of scrap film is produced. As a general indication it may be noted that a material which is so dirty as to necessitate filter replacement every four hours or less is regarded as commercially uneconomical.

The separator apparatus in accordance with this invention is interposed between the extruder outlet and the die and is virtually self-cleaning, so that it is able to operate continuously with grades of reclaimed material so dirty that a conventional filter must be replaced for example every hour or less.

Figure 2:
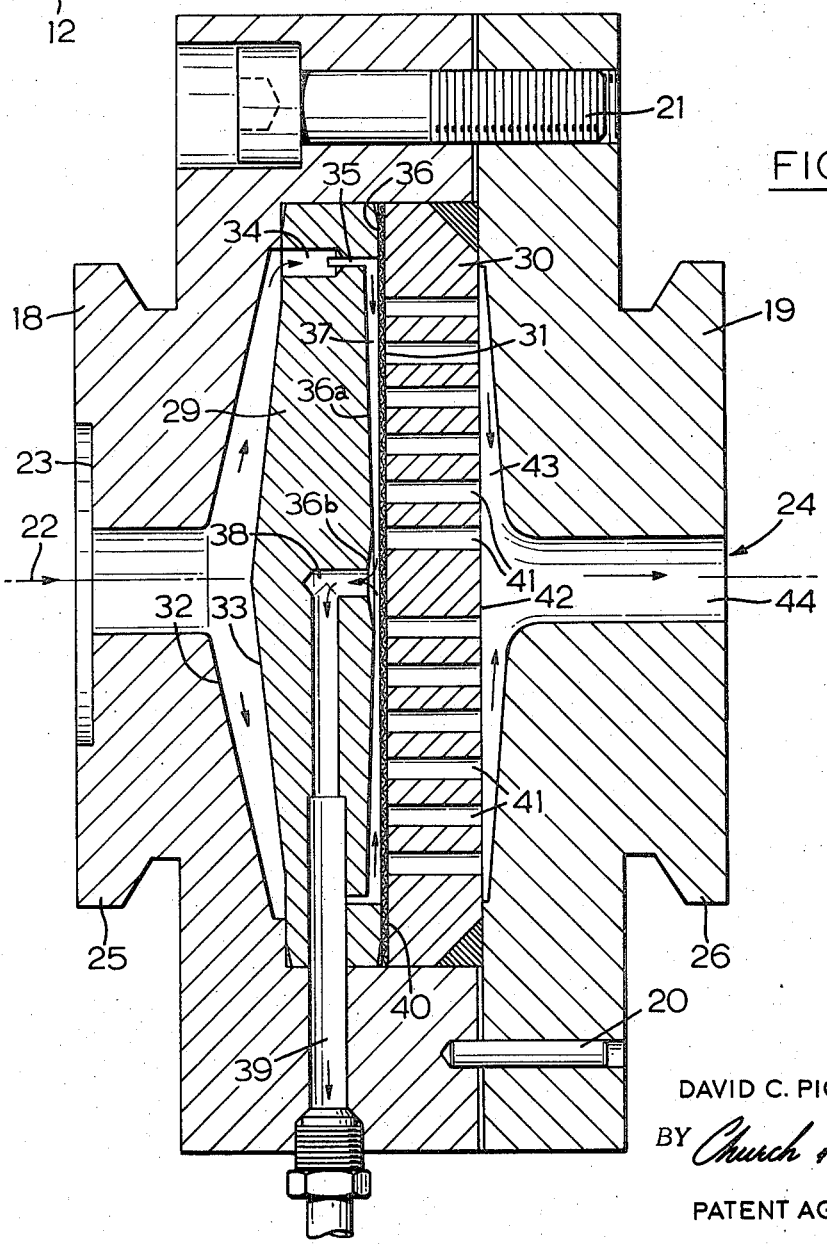
FIG. 2 is a longitudinal section on the line 2—2 of FIG. 3 of a separator apparatus comprising a first embodiment of the invention.

Referring now to FIGS. 2 and 3, the separator device which constitutes this particular embodiment comprises an inlet body part 18 and an outlet body part 19, the two parts being pinned in precise alignment with one another by circumferentially disposed pins such as 20, and fastened rigidly together by heavy screws such as 21. The parts 18 and 19 generally are symmetrical about a longitudinal axis 22, and have respectively a central circular inlet 23 and an aligned central circular outlet 24, in this embodiment the inlet and outlet being co-axial with one another. The two parts have respective radially extending flanges 25 and 26 which are engaged by respective circumferential clamps 27 and 28 (FIG. 1) to mount and seal the device in the machine with which it is used. A circular spreader plate 29 and a circular filter element support plate 30 are mounted in the device interior with a filter screen pack 31 sandwiched between them.

The hot liquid polymer under high pressure that flows through inlet 23 is diverted radially outward relative to the axis 22 in a passage formed between immediately facing surfaces 32 and 33 respectively of the part 18 and the spreader plate 29, the face 33 being that of a wide-angle cone to assist on stream-lining the flow of the plastic through the device. The radially outer part of the plate 29 is provided on its face 33 with a large number of equispaced circularly disposed counterbores 34, which feed the polymer into an annular axially extending slot 35 formed in the face 36 of the plate 29. A cylindrical passage 37 is formed between the face 36 of spreader plate 29 and the filter screen pack 31, and in this embodiment this passage is provided by a suitably shaped recess formed in the face 36. In particular the face 36a of this recess is so shaped that the axial length of the chamber 37 between the face 36a and the inlet face of the filter relative to the axis 22 decreases progressively radially inwards from the slot 35, until a centre portion 36b is reached, whereupon the axial length increases again. At its centre the chamber 37 discharges via an axial bore 38 coaxial with axis 22 and a succeeding radial bore 39 to the exterior of the device. Alternatively the axial length of the chamber may be constant.

In this particular embodiment the filter screen pack 31 comprises two or more circular layers of wire filter of successively coarser mesh in the direction of flow of the polymer material therethrough, so that each filter screen layer is supported by another filter screen layer of coarser mesh and the filter screen layer layer of coarsest mesh presses directly against and is supported by the rear face 40 of the support plate 30. The plate 30 is provided with a large number of evenly distributed axial bores 41, all opening to the face 42, which may therefore be regarded as the outlet face of the filter, and discharging into a passage 43, which discharges in turn via passage 44 to the outlet 24. The face 45 of the outlet member 19 is shaped so that the passage 43 increases in axial length between the faces 42 and 45 relative to the axis 22, and therefore in flow capacity in the direction of flow toward the outlet 24, to assist in maintaining a stream-line flow of the material that has passed through the filter; the face 42 of support plate 30 may also be suitably shaped for the same purpose, instead of being flat as shown.

The progressive increase in flow capacity of the passage 43 is correlated with the reduction in flow capacity of the passage 37, so that they cooperate with one another to maintain the flow velocity of the polymer across the whole face of the filter pack at a minimum value, as will be described below.

It will be seen that the separator body and the filter pack provide two flow paths, called herein for convenience in terminology a "by-pass" path and a "flow-through" path. The by-pass path is constituted by the inlet 23, passages 34, slot 35, chamber 37, axial bore 38 and radial bore 39, this path carrying the polymer material with the contaminant materials entrained therein, and having the inlet face of the filter pack 31 constituting a wall thereof, specifically a wall of the chamber 37 therein. The flow-through path also includes inlet 23, passages 34, slot 35 and chamber 37, but passes through the filter pack to the bores 41 and the passage 44 to outlet 24, this path beyond the filter pack carrying only material that has been made to pass therethrough.

In operation the circular cross-section stream of liquid polymer under high pressure that enters the inlet 23 flows radially outwards in the passage 32 then axially through the bores 34 and the annular slot 35, which constitutes an annular plenum chamber to form the material into a stream of annular cross-section and render the flow as even as possible after it has passed through the separate bores. The liquid then moves radially inward in the cahmber 37, in this embodiment substantially perpendicularly to the longitudinal axis 22, at the same time filtering polymer material through the pack 31 to the passage 44 and outlet 24. Any material such as contaminant particles that are unable to pass through the filter pack are swept by the remaining flowing liquid across the inlet face of the filter pack until they are carried out through the outlet 38 and the bore 39. The flow capacity of the part of the by-pass flow path constituted by the passage 37, and of the circular filter pack decreases with decrease of radius relative to the axis 22. The corresponding axial dimensions of the chamber 37 and the passage 43 are determined to maintain the flow velocity of the polymer across the filter pack face inlet at a value such that the separated particulate material will be kept entrained in the remaining liquid flow and swept along the chamber 37 to the outlet 39 without adhering to the filter pack inlet face.

In operating practice it is not found possible to prevent all of the filtered material from adhering to the filter pack face, and a slow but steady build-up of deposited material is experienced. Upon start-up with a new filter pack the back pressure of the polymer measured at the inlet 23 shows a more or less steady increase which continues until an operative maximum value is reached. Thereafter this maximum value is maintained with the filter apparently virtually self-cleaning for as long as polymer material is fed thereto. Any substantial increase above this maximum value indicates that too much of the filter pack has become inoperative, and it must be cleaned or replaced.

It is at present believed that this self-cleaning effect results, at least in part, from what is best described as the "scrubbing action" of the hot, viscous polymer as it passes under high pressure with a high degree of containment across the inlet face of the filter pack. It is believed also that the flow in the narrow, high-containment passage 37 is turbulent because of escape of liquid polymer therefrom through the filter pack 31, such turbulent flow at this point being desirable as assisting such a scrubbing action and also assisting in maintaining the separated material entrained in a considerably smaller volume of the remaining unfiltered liquid. That some such action as surmised herein is taking place is believed evidenced by the above-described observation of pressure build-up, and the increase in pressure is believed to increase the scrubbing action, since this explains why the increase usually only continues until the described stable condition has been reached, where the polymer is able by the presumed scrubbing action to at least delay appreciably any further build-up of lodged material. This stable maximum operative pressure condition may be maintained indefinitely, or may shift to higher or lower values, depending upon the specific operating conditions.

It is found that for effective and economic operation of the device the quantity of unfiltered polymer that is discharged via the outlet 39 should be as small as possible, while being correlated with the percentage of material to be filtered, so as to ensure that the continuous self-cleaning action is achieved. It is also found that there is a preferred correlation between the radially-inward rate of flow in the by-pass flow path of the remaining unfiltered material and the axial rate of flow in the through-flow path through the filter pack of the filtered material, which may be expressed as a velocity ratio. This velocity ratio preferably is 2.5:1 or greater. It is also found preferable as a general rule to arrange that the flow through the device is as smooth and as streamlined as possible in order to prevent hang-up and degradation of the processed material.

Since the rate of flow of the polymer material from the feeding means 10 to the die 16 is determined principally by the physical characteristics of the film to be produced, and should be maintained within predetermined limits, the above-mentioned velocity ratio and the consequent back-pressure of the processed polymer are maintained within their preferred limits by the operation of a throttle device 46 fed from the outlet bore 39. As the throttle device is closed to reduce the flow therethrough the flow velocity of the material issuing through the outlet 39 will be reduced, while the flow velocity of the filtered material passing through the filter pack and its back pressure will be increased, and vice versa as the throttle device is opened.

Figure 5:
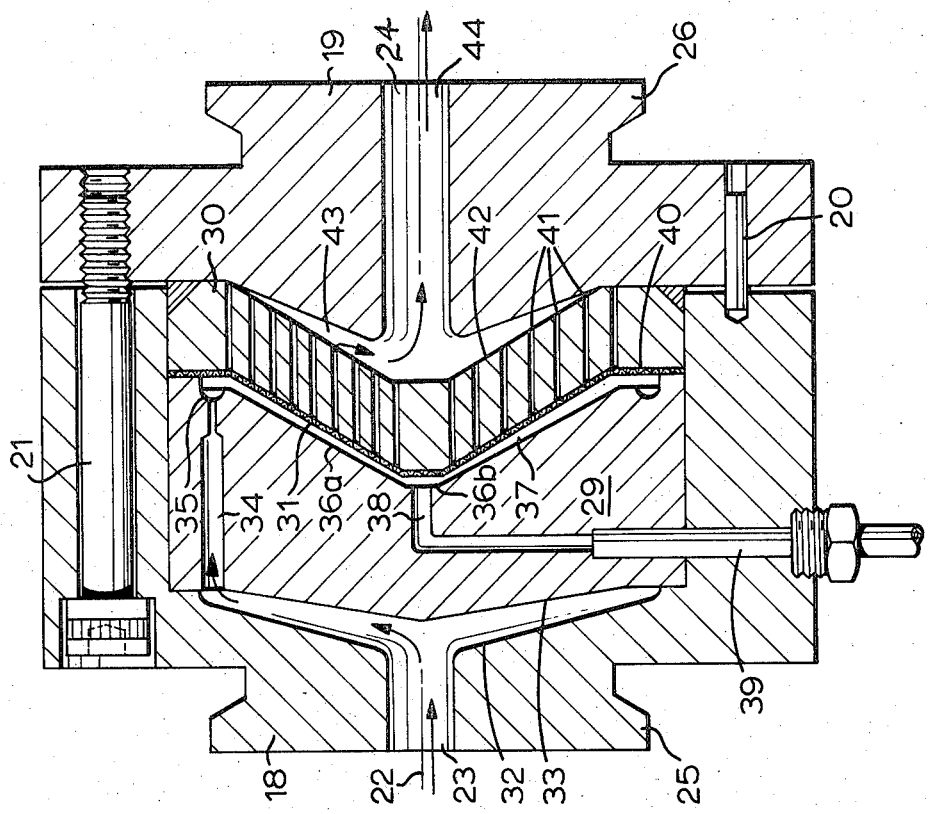
FIGS. 4 to 8 are longitudinal sections similar to FIG. 2 of other separator apparatus comprising respective other embodiments of the invention.
Figure 4:
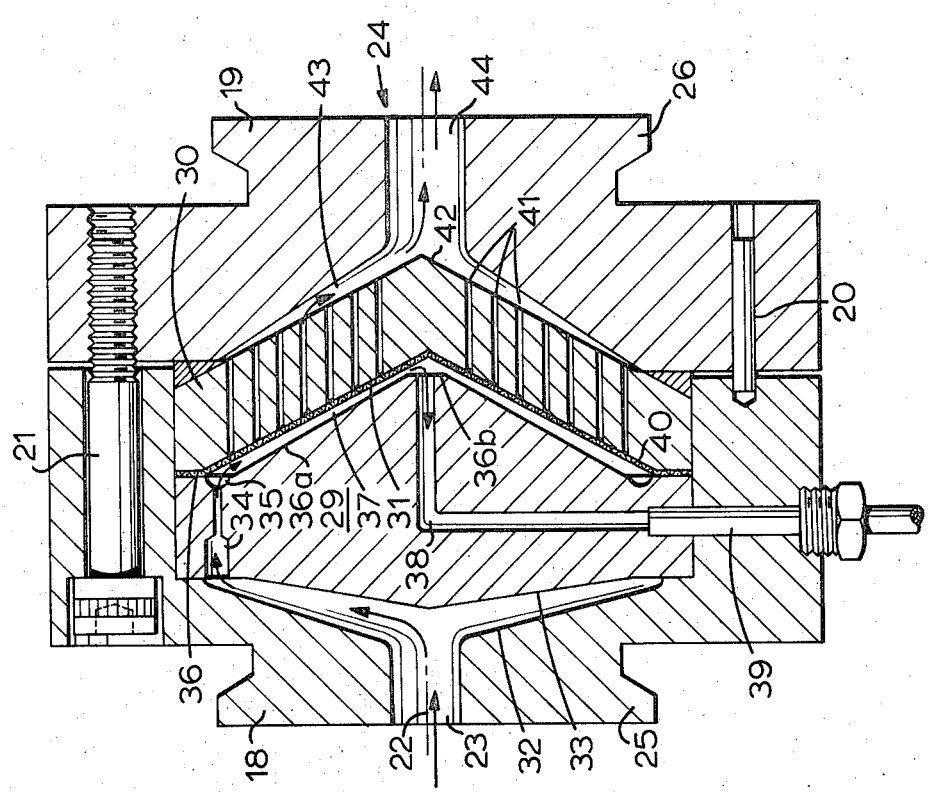

Although in the embodiment so far described the flow of polymer in contact with the filter medium is perpendicularly radially inward, in other embodiments the flow may have an axial component provided that the required minimum velocity ratio in the device is maintained. For example, in the device illustrated by FIG. 4 the filter pack 31 is of conical shape concave toward the inlet 23, so that the flow of polymer in the chamber 37 is both axially forward and radially inward. Similarly, in the device illustrated by FIG. 5 the filter pack 31 also is of conical shape, but is convex toward the inlet so that the flow in the chamber 37 is both axially rearward and radially inward.

Figure 6:
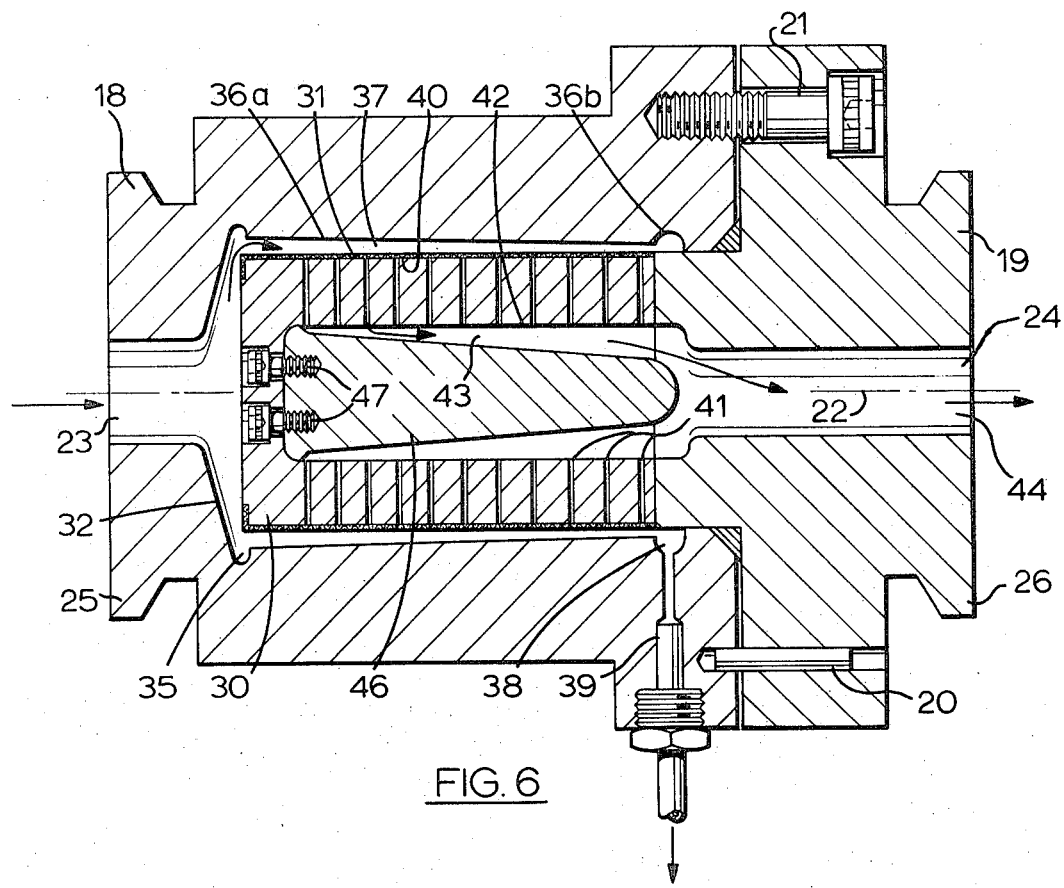
Figure 7:
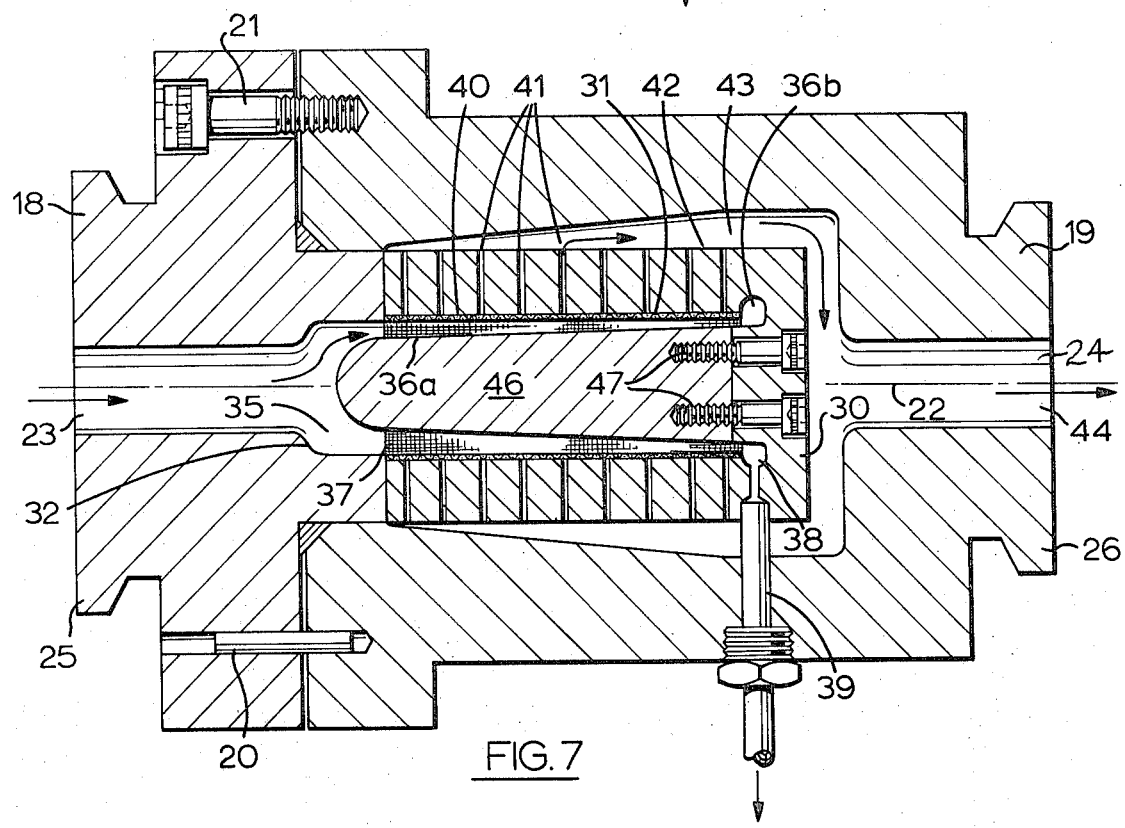

The embodiments of FIGS. 6 and 7 are similar to one another in that the filter pack 31 is cylindrical coaxial with the axis 22. In the embodiment of FIG. 6 the flow in the by-pass flow path is essentially axial over the filter pack, which is mounted around the outside circumference of the support cylinder 30, while the flow in the flow-through path is radially inward from the inlet to the outlet, an internal mandrel 47 being provided attached by screws 48 to the support cylinder 30, so as to provide the desired streamline flow to the outlet 24. In the embodiment of FIG. 7 the by-pass flow path flow also is essentially axial over the filter pack, which is mounted on the inside circumference of annular cross-section support plate 30, but the flow in the flow-through path is radially outward from the inlet to the outlet. In both of these embodiments the required reduction in flow capacity of the by-pass flow path across the face of the filter pack is produced by appropriate reduction of the radial distance between the face 36a and the opposite face of the filter pack.

Figure 9:
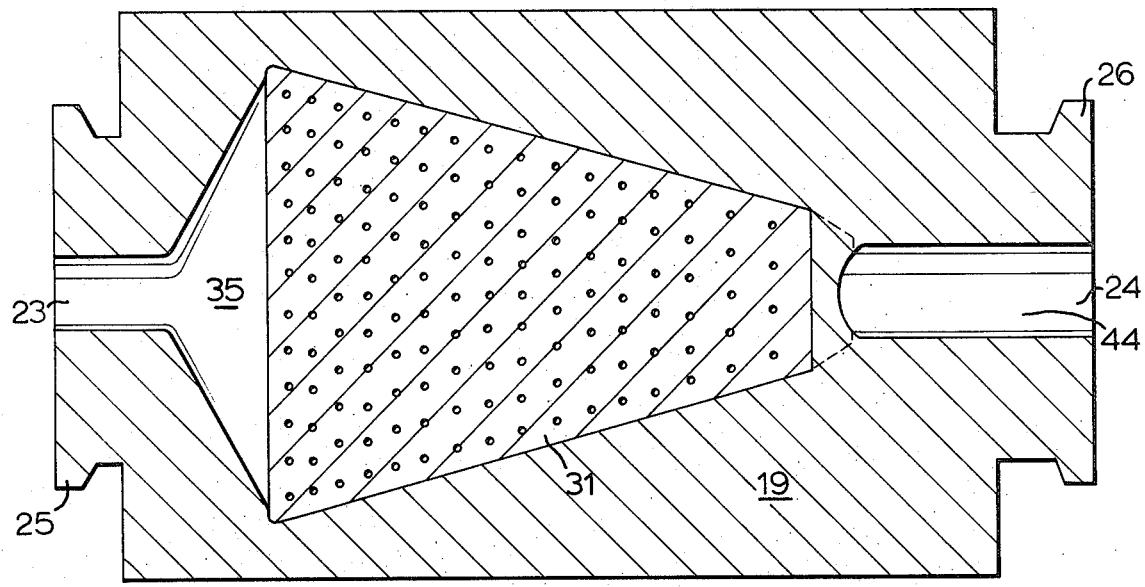
FIG. 9 is a section on the line 9—9 of FIG. 8.
Figure 8:
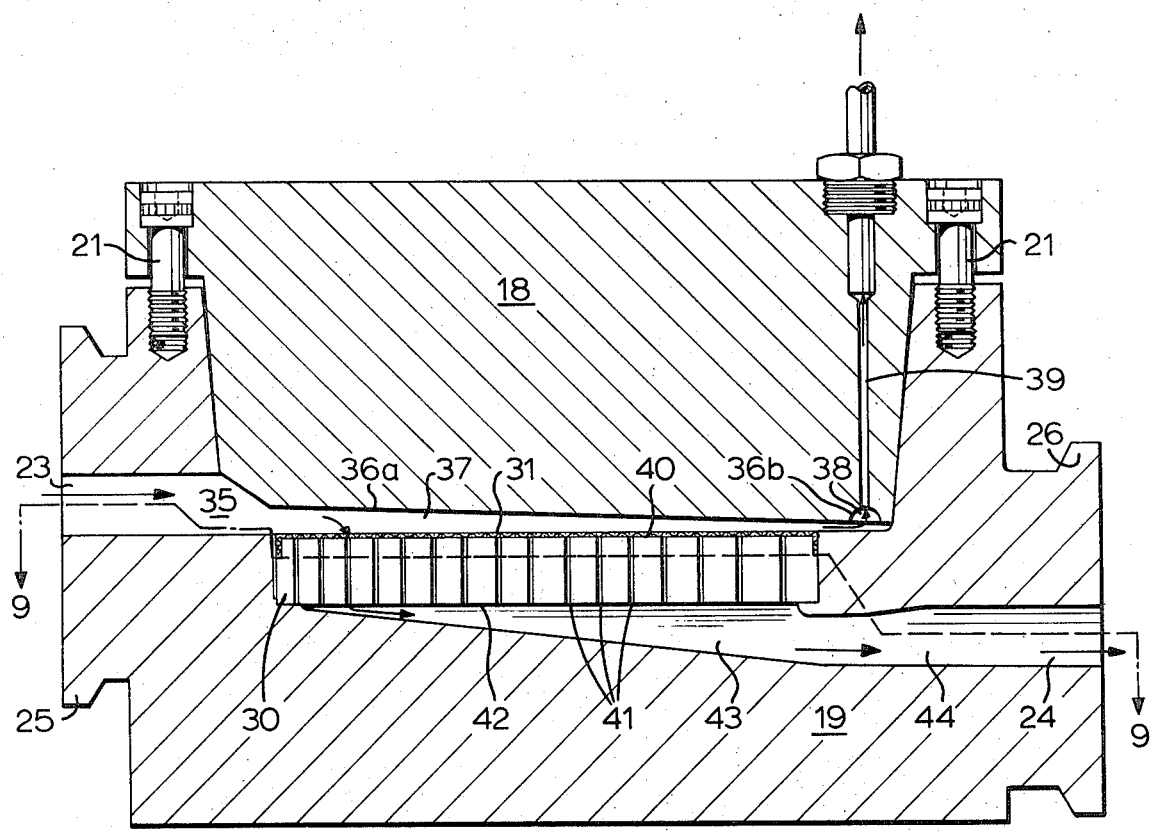

The embodiment of FIGS. 8 and 9 differs from the preceeding embodiments in that the flow of polymer material is introduced into the filter body through the circular aperture 23 and then is spread into a rectangular cross-section sheet, in which form it passes over the operative face of the filter pack in the by-pass flow path. The filter pack is of truncated triangular shape as seen in plan (FIG. 9), the required reduction in flow capacity being produced by the reduction in width of the filter pack together with a progressive decrease in the height of the chamber 37 perpendicular to said operative filter pack face. The inlet body part 18 has the form of a wedge-shaped insert that fits into a corresponding recess in the outlet body part 19, the polymer passing from the inlet 23 directly to the space 35 constituting a plenum chamber distributing the polymer for even flow over the filter pack.

I claim:

1. Apparatus for separating particulate material from a stream of flowable material having the particulate material mixed therein the apparatus comprising:
   a. a separator body having an inlet and first and second outlets;
   b. a filter element within the separator body having an inlet face and an outlet face, the inlet face thereof constituting at least part of a wall of a by-pass flow path which path extends from the inlet to the first outlet, the filter element intercepting a flow-through path which extends from the inlet to the second outlet so that all flowable material issuing from the second outlet must pass through the filter element.
   c. passage means within the body providing the said by-pass and flow-through paths;
   d. the said passage means having at least one wall co-operating with the inlet filter face to provide in the by-pass path a flow passage across the said inlet face of decreasing flow capacity in the direction of flow in the by-pass path;
   e. the said passage means having at least another one wall co-operating with the outlet face of the filter element to provide in the flow-through path a flow passage of controlled flow capacity across the said outlet face in the direction of flow in the flow-through path of material that has passed through the filter element;
   f. the said flow passages co-operating for maintenance of the flow velocity of the material passing in the by-pass path over the filter inlet face above a value which will cause particulate material to be entrained in the remaining flowable material in the by-pass path for prevention of its deposition on the filter element inlet face.

2. Apparatus as claimed in claim 1, and comprising a throttle connected to the first outlet to receive unfiltered material of the by-pass path therefrom and to maintain the back pressure of the filtered material of the flow-through path within predetermined limits.

3. Apparatus as claimed in claim 2, wherein the said flow passages of the by-pass and flow-through flow paths pass the mixed material therethrough with a ratio at least 2.5:1 between the velocity of the reduced volume mixed material stream passing in the by-pass path across the filter element inlet face and the velocity of the filtered material stream passing in the flow-through path through the filter element.

4. Apparatus as claimed in claim 1, wherein the said passage means include an annular-shaped part feeding the said mixed material as a stream of annular cross-section having a direction of flow coincident with an axis centered on the annulus, and the part of the said by-pass flow path including the filter inlet face extends from said annular shaped part of the passage means radially inwardly toward the axis substantially perpendicular thereto.

5. Apparatus as claimed in claim 4, wherein the said passage means of the by-pass path includes a part located on the said axis, the last mentioned passage means part feeding material that has passed over the filter inlet face in the direction opposite to that of the said annular cross-section stream of mixed material.

6. Apparatus as claimed in claim 1, wherein the spacing between the filter element inlet face and the said at least one wall co-operating therewith changes in the direction of flow in the by-pass flow path for change in the flow capacity of the path.

7. Apparatus as claimed in claim 1, wherein the said filter element inlet face is of circular shape and the said at least one wall co-operating therewith is also circular and is disposed generally parallel thereto, the mixed stream flowing in the said by-pass path across the circular filter inlet face radially inward toward the centre of the filter element.

8. Apparatus as claimed in claim 7, wherein the axial spacing between the filter element inlet face and the co-operating wall changes to change the flow capacity of the by-pass flow path.

9. Apparatus as claimed in claim 1, and for the separation of entrained solid particulate material from a flowable polymer material, and comprising a throttle connected to the first outlet to receive unfiltered material of the by-pass path therefrom and to maintain the back pressure of the filtered material of the flow-through path within predetermined limits.

10. Apparatus as claimed in claim 1, wherein the said filter element inlet and outlet faces are of conical shape and the said walls co-operating therewith are of the same shape with the by-pass and flow-through paths extending in the direction from the base toward the apex of the cone.

11. Apparatus as claimed in claim 1, wherein the said filter element inlet and outlet faces are of cylindrical shape and the said walls co-operating therewith are of the same shape with the by-pass and flow through paths extending in the direction from one end of the cylinder to the other.

12. Apparatus as claimed in claim 1, wherein the said filter element inlet and outlet faces are of truncated triangular shape and the said walls co-operating therewith are of the same shape with the by-pass and flow through parts extending in the direction from the base toward the apex of the triangle.

13. In apparatus for the continuous extrusion of flowable polymer material comprising a die for forming the polymer material to a predetermined cross-section and means for feeding the polymer material under pressure to the die, the provision of a separator apparatus for separating unwanted particulate material from the polymer material, the separator apparatus comprising:

a. a separator body having an inlet and first and second outlets;
b. a filter element within the separator body having an inlet face and an outlet face, the inlet face thereof constituting at least part of a wall of a by-pass flow path which path extends from the inlet to the first outlet, the filter element intercepting a flow-through path which extends from the inlet to the second outlet so that all flowable material issuing from the second outlet must pass through the filter element;
c. passage means within the body providing the said by-pass and flow-through paths;
d. the said passage means having at least one wall co-operating with the inlet filter face to provide in the by-pass path a flow passage across the said inlet face of decreasing flow capacity in the direction of flow in the by-pass path;
e. the said passage means having at least another one wall co-operating with the outlet face of the filter element to provide in the flow-through path a flow passage of controlled flow capacity across the said outlet face in the direction of flow in the flow through path of material that has passed through the filter element; and
f. a throttle connected to the first outlet to receive unfiltered material of the by-pass path therefrom and to maintain the back pressure of the filtered material of the flow-through path within predetermined limits.

14. Apparatus as claimed in claim 13, wherein the said flow passages of the by-pass and flow-through flow paths pass the mixed material therethrough with a ratio at least 2.5:1 between the velocity of the reduced volume mixed material stream passing in the by-pass path across the filter element inlet face and the velocity of the filtered material stream passing in the flow-through path through the filter element.

15. Apparatus as claimed in claim 13, wherein the said passage means include an annular-shaped part feeding the said mixed material as a stream of annular cross-section having a direction of flow coincident with an axis centered on the annulus, and the part of the said by-pass flow path including the filter element face extends from the said annular shaped part of the passage means with a radially inwardly directed component relative to the said axis.

16. Apparatus as claimed in claim 13, wherein the said passage means include an annular-shaped part feeding the said mixed material as a stream of annular cross-section having a direction of flow coincident with an axis centered on the annulus, and the said by-pass flow path including the filter inlet face extends from said annular shaped part of the passage means radially inwardly toward the axis substantially perpendicular thereto.

17. Apparatus as claimed in claim 14, wherein the said passage means of the by-pass path includes a part located on the said axis, the last-mentioned passage means part feeding material that has passed over the filter inlet face in the direction opposite to that of the said annular cross-section stream of mixed material.

18. Apparatus as claimed in claim 13, wherein the spacing between the filter element inlet face and the said at least one wall co-operating therewith changes in the direction of flow in the by-pass flow path for change in the flow capacity of the path.

19. Apparatus as claimed in claim 13, wherein the said filter element inlet face is of circular shape and the said at least one wall co-operating therewith is also circular and is disposed generally parallel thereto, the mixed stream flowing in the said by-pass path across the circular filter inlet face radially inward toward the centre of the filter element.

20. A method of separating particulate material from a stream of flowable polymer material having the particulate material mixed therein, the method involving:

a. the employment of a separator having a filter therein with a face of the filter constituting a wall of a by-pass flow path from an inlet to a respective first outlet, the path being of decreasing flow capacity across the filter in the direction of flow in said path, and the filter being interposed in a flow-through path from the said inlet to a respective second outlet;

b. continuously feeding the said stream of flowable polymer material to the separator inlet at a controlled rate;

c. simultaneously continuously discharging filtered polymer material from the said second outlet at a controlled rate;

d. simultaneously continuously discharging unfiltered polymer material with unfiltered particulate material remaining mixed therein from the said first outlet through a throttle valve; and e. adjusting the throttle valve to control the discharge of said unfiltered mixed material from the first outlet to maintain a ratio of at least 2.5:1 between the velocity of the reduced volume mixed material stream passing in the by-pass path across the filter element face and the velocity of the filtered polymer material stream passing in the flow-through path through the filter element.

* * * * *